Jan. 15, 1957  J. GILBERT ET AL  2,777,488
CARVING BOARDS WITH RETRACTABLE SPIKES
Filed Sept. 15, 1955
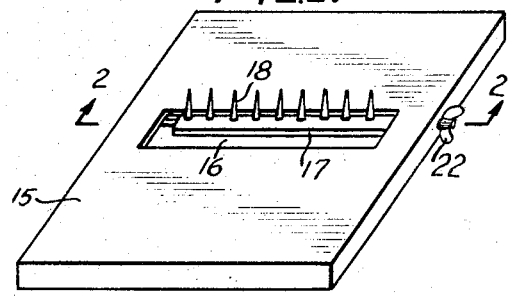
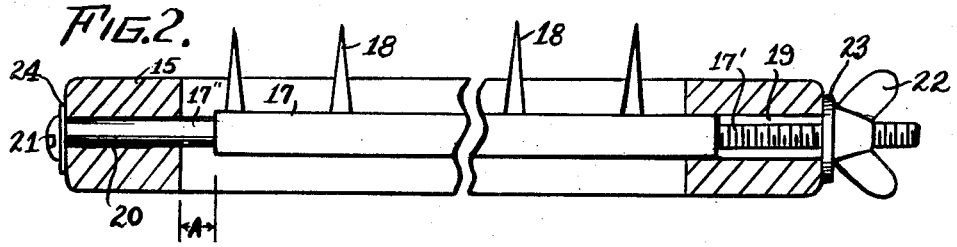
INVENTORS,
JACK GILBERT,
HARRY PREBLE, JR.
BY-
Attorney.

United States Patent Office 2,777,488
Patented Jan. 15, 1957

2,777,488
CARVING BOARDS WITH RETRACTABLE SPIKES

Jack Gilbert, Newburgh, and Harry Preble, Jr., Cross River, N. Y., assignors to General Slicing Machine Co., Walden, N. Y., a corporation of New York Application September 15, 1955, Serial No. 534,454

5 Claims. (Cl. 146—215)

The present invention relates to improvements in carving boards for roasts and the like, and more particularly to the type having spikes extending from the food-supporting surface of the board, to engage the food mass.

Boards having fixed spikes, present a hazard when not in use. Heretofore, various attempts have been made to cover the spikes, either by a separate or hinged cover extending over the board area. When such board was in use, the cover had no utility, and when hinged, required twice the table area for the article to be set for use. In some, the spikes were individually removable. They were still exposed where stored and too often got lost. Joining all the spikes to a single member and removable with such member from the board body, did not remove the hazard of a person suffering injury.

It is therefore the principal object of this invention to provide a carving board of novel and improved construction affording a unitary structure with provision whereby all the spikes are retractable to a position between the surfaces of the carving board by a simple manipulation, and just as easily positionable into use position.

A further object hereof is to provide a novel and improved carving board having a plurality of spikes which are simultaneously shiftable to use and non-use position.

Another object hereof is to provide a novel and improved carving board of the character mentioned, which is reasonably cheap to manufacture, easy to use and manipulate, and efficient in carrying out the purposes for which it is designed.

Other objects and advantages will become apparent as this disclosure proceeds.

In the accompanying drawings forming part of this invention, similar characters of reference indicate corresponding parts in all the views.

Fig. 1 is a perspective view of a carving board embodying the teachings of this invention.

Fig. 2 is an enlarged section taken at lines 2—2 in Fig. 1.

In the embodiment shown in Fig. 1, the carving board 15 has an elongated cavity in its top surface, or if desired such cavity may be provided by the slot 16. A horizontally positioned shaft 17 has a series of aligned spikes 18 spaced therealong, extending laterally thereof. This shaft lies within and along said slot near an edge thereof and through aligned holes 19 and 20 which extend through said board from its side edges into said slot. One end of said shaft is headed as at 21, while its other end is threaded for a nut 22 which may be of the wing-type. The numerals 23, 24 indicate washers which may be included. In use, the shaft is set so that spikes 18 extend upwardly vertical above the upper surface of the board 15. When not in use, the shaft is turned so that its spikes come at least horizontal or sufficient to be between the board surfaces. The length of the spikes is of course sufficient for engagement of a roast set on the board and the width of the slot 16 is sufficient to receive the spikes therein when in non-use position. So that the said slot is as narrow as possible, the shaft 17 is near one longitudinal wall of said slot. Tightening the nut 22, fixes the shaft in any of its required positions.

It is desirable to securely lock the shaft 17 in use and non-use positions respectively. One way, is to have the shaft of square stock, with its end portions 17', 17" reduced round. Hole 19 is made square for the said shaft to fit therein. The length of the shaft which is square, should be a bit less than the length of the slot 16. The length of the reduced end 17" should be somewhat longer than the length of the hole 20 to permit longitudinal movement of the shaft 17. Now when said shaft is set into use or non-use positions and the nut tightened, a square end portion of the shaft will slide into the square hole 19, thus locking the shaft against rotation. Release of the nut 22, will permit the shaft 17 to be slid towards the left in Fig. 1 and the shaft is thus freed for rotation.

The board 15 may be of any desired surface area, perimetral contour and its top surface may be grooved as is customary in this class of merchandise. If desired, suitable handles or other appurtenances may be provided.

This invention is capable of numerous forms and various applications without departing from the essential features herein disclosed. It is therefore intended and desired that the embodiments shown herein shall be deemed illustrative and not restrictive and that the patent shall cover all patentable novelty herein set forth; reference being had to the following claims rather than to the specific description herein to indicate the scope of this invention.

We claim:

1. In a unitary structure of the character described, a carving board having a space therein opening in the top surface of such board, a member rotatably mounted within said space for movement therein about an axis substantially parallel to the surfaces of the board and at least one spike carried by said member whereby in one position of said member, said spike or spikes will extend uprightly above the upper surface of the board and when said member is moved substantially a quarter turn, said spike or spikes will be positioned so that at least their points will lie within said space in the board; said spike-carrying member comprising a rod capable of some longitudinal movement and lying in a hole in said board; said hole having a part which is of non-circular cross section; said rod having a similar non-circular section adjacent said non-circular part of the hole and shiftable thereinto to become engaged therein at least when the spike-carrying member is in position where the spike or spikes it carries extend uprightly above the upper surface of the board; said non-circular part of the hole and non-circular portion of the rod constituting a locking means.

2. The article as defined in claim 1, wherein said hole opens into the mentioned space in the board and such opening of said hole is the portion thereof which is non-circular.

3. The article as defined in claim 1, including means to releasably hold said rod against movement out of its engagement with said hole.

4. The article as defined in claim 1, wherein the non-circular rod section is also shiftable into the non-circular part of the hole to become engaged therein when the spike-carrying member is in position when at least the point or points of the spike or spikes it carries are between the surfaces of the board.

5. The article as defined in claim 1, wherein the spike-carrying member is along an edge of the space in the board and the mentioned axis is along such edge of the space.

References Cited in the file of this patent

UNITED STATES PATENTS 1,888,009    Moss ------------------ Nov. 15, 1932

FOREIGN PATENTS 15,140    Great Britain ------------------ 1891
248,587    Germany -------------- June 25, 1912